No. 754,033. PATENTED MAR. 8, 1904.
P. YOUNG.
TAIL HOLDER FOR COWS.
APPLICATION FILED JUNE 1, 1903.
NO MODEL.

Witnesses.
K. K. Keffer
C. G. Hague

Inventor, Peter Young.
by Orwig & Lane Attorneys.

No. 754,033.

Patented March 8, 1904.

UNITED STATES PATENT OFFICE.

PETER YOUNG, OF ROCKFALLS, IOWA.

TAIL-HOLDER FOR COWS.

SPECIFICATION forming part of Letters Patent No. 754,033, dated March 8, 1904.

Application filed June 1, 1903. Serial No. 159,432. (No model.)

*To all whom it may concern:*

Be it known that I, PETER YOUNG, a citizen of the United States, residing at Rockfalls, in the county of Cerro Gordo and State of Iowa, have invented a certain new and useful Tail-Holder for Cows, of which the following is a specification.

The objects of my invention are to provide a device of simple, durable, and inexpensive construction that may be readily, quickly, and easily placed on a cow's back and easily and quickly adjusted to cows of various sizes and when placed in position will securely hold the animal's tail against such movement as might disturb or annoy a person milking a cow.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
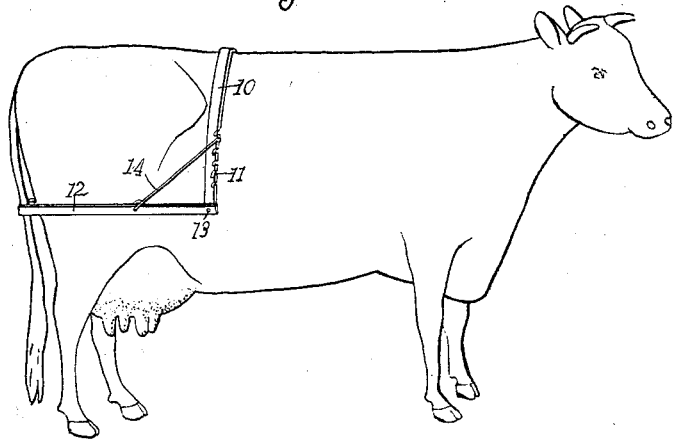
Figure 2:
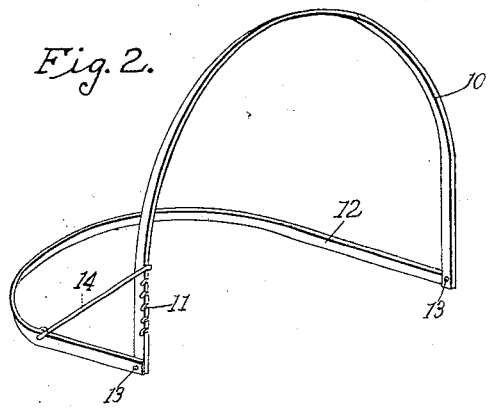

Figure 1 shows the device applied to a cow as in practical use, and Fig. 2 shows a perspective view of the device detached.

Referring to the accompanying drawings, I have used the reference-numeral 10 to indicate a semicircular strap, preferably made of spring metal and designed to pass over and rest upon a cow's back directly in front of the animal's hip. At one end of the part 10 I have formed a series of notches 11 for purposes hereinafter made clear.

The numeral 12 indicates a strap also semicircular in shape and preferably made of spring metal. The ends of the part 12 are pivoted to the ends of the part 10 by means of the rivets 13, and the length of the part 12 is such that when the strap 10 is in position on the animal's back in front of the hips the part 12 may pass around the rear of the animal and inclose the animal's tail.

The numeral 14 indicates a hook, pivoted to one side of the part 12 and capable of entering any one of the notches 11.

In practical use and assuming the device is to be applied to an animal of medium size the strap 10 is first placed on the cow's back in front of the hips, and the part 12 is arranged substantially at right angles to the part 10 and made to inclose the animal's tail, the hook 14 being placed in the proper one of the notches 11 for supporting the part 12 in a substantially horizontal position. If the device is to be applied to an animal of large size, the rear end of the part 12 is lowered by adjusting the hook 14 to one of the lower notches 11, so that the two straps 10 and 12 stand in a position at an obtuse angle relative to each other and the animal's tail is engaged at a point farther down than would be the case with an animal of medium size, and if the device is applied to a smaller animal the part 12 set at an acute angle relative to the part 10, thus projecting the lower ends of the part 10 forwardly and engaging the animal's tail at a point higher than would be the case on an animal of medium size.

It is obvious that the same tail-holder may be applied to animals of various sizes and be adjusted very quickly and easily.

When the tail-holder is in use on an animal of any size, the resilience of the straps 10 and 12 tend to hold the straps firmly in position on the animal's back, and by placing the strap 10 immediately in front of the animal's hips it is obvious that the tail-holder cannot be moved rearwardly by switching movements of the animal's tail.

When a person is engaged in milking a large number of cows, he carries the tail-holder from one animal to the other, and the device is quickly and easily placed on the animal's back and adjusted to position to fit the particular animal by means of the hook 14, which is arranged on the right side of the device, so as to be convenient for the operator.

Having thus described my invention, what I claim, and desire to secure by Letters Patent of the United States therefor, is—

1. In a device of the class described, a springing strap shaped to pass over an animal's back and downwardly at its sides with its ends yieldingly held against the animal's sides, a second springing strap with its ends pivoted to the ends of the first, and shaped to pass around the animal's tail, and a hook adjustably connecting two of the adjacent ends of the straps.

2. In a device of the class described, the combination of a semicircular strap 10 made of spring metal, a semicircular strap 12 made of spring metal and having its ends pivoted to the ends of the strap 10 and a hook 14 pivoted to the strap 12 and adjustably connected with one of the upright portions of the strap, substantially as and for the purposes stated.

PETER YOUNG.

Witnesses:
J. H. GILDNER,
JOHN B. FESTL.